Sept. 29, 1970  N. A. BLAD ET AL  3,531,146
PRESS OR SHRINK FIT JOINTS
Filed June 6, 1968

INVENTORS
NILS AUGUST BLAD
AXEL ERLAND BRATT
BY Howson & Howson
ATTYS.

3,531,146
PRESS OR SHRINK FIT JOINTS
Nils August Blad, Hofors, and Axel Erland Bratt, Molndal, Sweden, assignors, by mesne assignments, to SKF Industries, Inc., Philadelphia, Pa., a corporation of Delaware
Filed June 6, 1968, Ser. No. 735,146
Claims priority, application Sweden, June 8, 1967, 8,040/67; Mar. 29, 1968, 4,168/68
Int. Cl. F16d *1/02;* F16l *21/00*
U.S. Cl. 287—114                                    3 Claims

ABSTRACT OF THE DISCLOSURE

A coupling for connecting a pair of shaft members in end-to-end relation including an inner sleeve spanning the juncture of the members. An outer sleeve circumscribes the inner sleeve and a plurality of rings are shrunk fit to the outer sleeve. The confronting surfaces of the inner and outer sleeves are complementary tapered. A passageway is provided for introducing a pressure medium between the tapered contacting surfaces to facilitate relative axial movement of the outer sleeve and rings relative to the inner sleeve. An annular chamber at one end of the coupling is pressurized with a fluid to effect relative axial displacement of the sleeve members.

---

The present invention relates to improvements in press or shrink fit joints, particularly those of large dimensions, and has for its purpose to simplify the manufacture and heat treatment of the parts of such joints. In order to facilitate the assembly and disassembly of joints of this kind, the so-called pressure oil method is frequently used in which a pressure medium, for example oil, is forced through grooves and channels in the parts of the joints and in between the contacting pressure surfaces of the joint. A joint according to the invention is preferably assembled and disassembled by the above mentioned method. A well known joint of this type used for connecting shafts to each other is the SKF coupling of OK type consisting of a thin inner sleeve mounted on the adjacent ends of the two shafts and having a slightly tapering outer surface, there being a thicker single piece sleeve having a correspondingly tapered bore to fit the tapered surface of the inner sleeve mounted on the inner sleeve and having channels and grooves through which a pressure medium can be forced when assembling or disassembling the joint.

The device according to the invention consists of coupling members comprising inner and outer sleeves and inner members comprising the two shaft ends and is characterized thereby that the outer sleeve is composed of an inner member on which two or more rings are mounted.

By the above described means it will be possible to make couplings of large dimensions with the aid of simpler resources. The manufacture of outer sleeves made in a single piece has been limited, as far as dimensions are concerned, by the size of the blank from which it is made and available facilities for forging the blanks. By making the sleeve in several parts the capacity of making large units is increased. By suitable choice of the press fit between the inner member of the outer sleeve and the rings a favourable distribution of the tension in the parts and lower stresses are obtained in the assembled joint.

Figure 1:
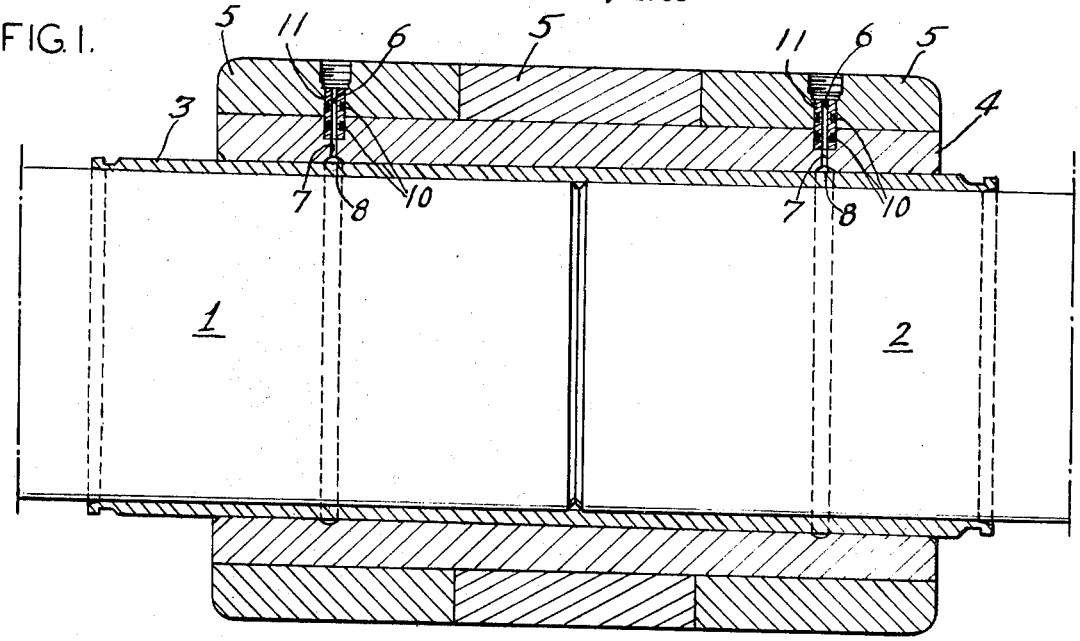
Figure 3:
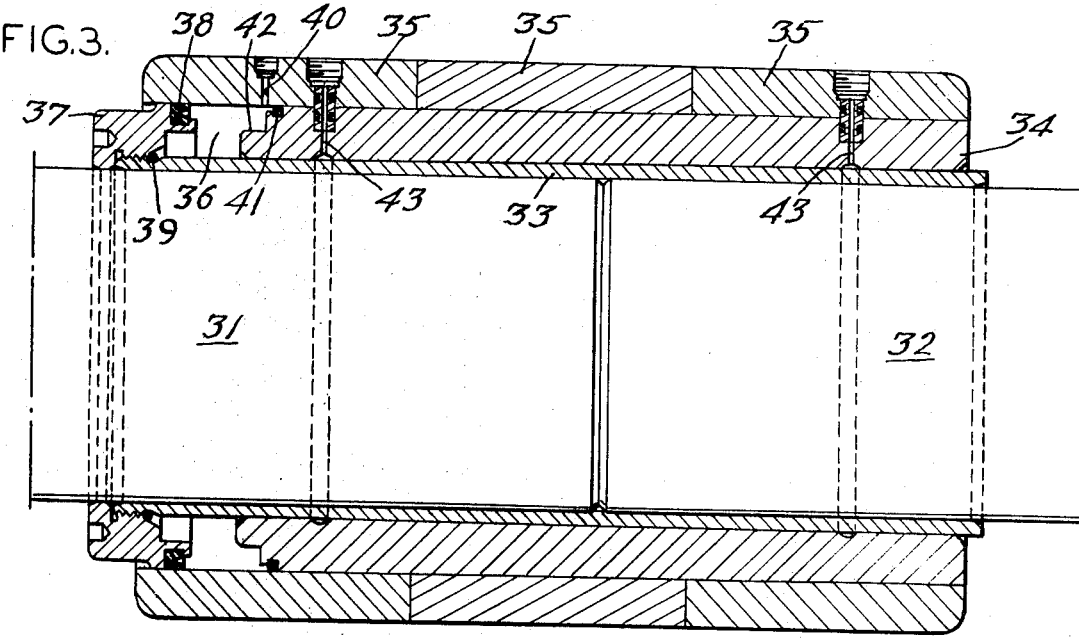
Figure 2:
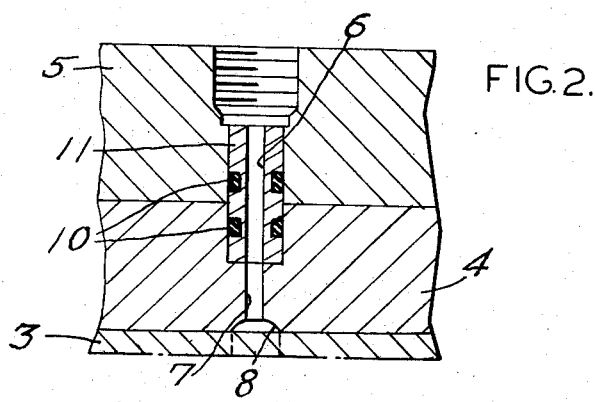

The invention is described in the following with reference to the accompanying drawings in which FIG. 1 shows a shaft coupling of the above mentioned type and FIG. 2 shows on a larger scale a pressure channel and a sealing member therefor. FIG. 3 shows a modified device which makes provision for mounting a disassembling tool therein.

The coupling encircles a pair of shaft ends designated 1 and 2 in FIG. 1. On the shaft ends is mounted a thin sleeve 3 having a slightly tapered outer surface, there being an outer sleeve mounted thereon. This sleeve comprises an inner member 4 on which two or more rings 5 are mounted, three being shown in the figure. The number of sleeves may vary according to the size of the coupling and depending on the purpose for which it is required. The rings are preferably shrunk onto the member 4. As above mentioned the coupling may be assembled and disassembled by the SKF oil pressure method. For this purpose one or more of the rings 5 and the member 4 are provided at suitable locations with channels 6 and 7. These channels lead in a known manner to annular grooves 8 in the inner surface of the member 4. When pressure medium is introduced through the said channels it penetrates between the contacting surfaces of the member 4 and the sleeve 3 creating a film between these members which makes it possible to displace the member 4 and the rings 5 thereon along the shaft.

FIG. 2 shows how the pressure medium is prevented from penetrating between the member 4 and the rings 5 by means of a sealing member disposed in the channel 6. This sealing member may consist of an elastic ring 10 mounted in a circular groove in a short tube 11. The tube serves to locate the ring 10 opposite the contacting surfaces of the above mentioned members. Alternatively, a sealing member consisting merely of a tube of rubber or other elastic material may be substituted for the tube and ring.

The modification of the invention shown in FIG. 3 is provided with a hydraulic assembling tool and has, like the device shown in FIG. 2, a slightly tapering thin sleeve 33 mounted on the ends of a pair of shafts 31 and 32. Mounted on the sleeve 33 is an outer sleeve having an inner member 34 on which are applied two or more rings 35, three such rings being shown in the figure. To aid in assembling the coupling by means of a pressure medium the left-hand ring as shown in the figure has been extended so far past the end of the member 34 that an annular chamber 36 is formed between the inner surface of the ring 35 and the tapered sleeve 33. The small end of the latter is threaded and a cover member 37 is screwed thereon. The cover member is provided with a suitably formed sealing member 38 which seals against the inner surface of the ring 35. The cover member is also provided with a seal 39, for instance an O-ring, located at the end of the thread on the tapered sleeve 33. For the introduction of a pressure medium from any suitable source (not shown) a channel 40 is provided in the ring 35. An escape for air from the chamber 36 must be provided but is not shown as it may be of any suitable kind. Further to seal the chamber 36 a seal 41, which also may be an O-ring, is located at the end of the member 34. In order to increase the volume of the chamber 36 the end of the member 34 may be stepped to provide a recess 42. The end portion of the member 34 will thus be thinner than the rest thereof which will serve to decrease the edge load which is created when the coupling is in position on the shafts.

The method of assembly is very simple. The various members of the coupling are put in position around the shafts and by introducing a pressure medium into the chamber 36 the inner member 34 and the rings 35 mounted thereon are forced along the shafts until a firm joint between the shafts and the coupling is obtained.

In order to facilitate this movement of the member 34 pressure medium is at the same time introduced between the contacting surfaces of the member 34 and the sleeve 33 through channels 43.

Similar means may be applied at the large end of the tapered sleeve which may, as required, be used for disassembling the coupling and if so desired such device may be applied at both ends of the sleeve and thus provide means both for assembling and disassembling the coupling.

What is claimed is:

1. A joint for connecting a pair of members in end-to-end relation comprising an inner sleeve spanning the juncture of said members having a slightly tapered outer peripheral surface extending the axial length of said inner sleeve, an outer sleeve circumscribing said inner sleeve and having a complementary tapered inner surface extending the axial length of said outer sleeve, a plurality of rings each having an axial length less than the axial length of said outer sleeve shrunk fit to said outer sleeve, means for introducing a pressure medium between the contacting surfaces of said inner and outer sleeves to facilitate axial movement of said outer sleeve and rings relative to said inner sleeve, and means defining an annular chamber formed in part by the axial end face of said outer sleeve member and including channel means communicating with said chamber adapted to be connected to a suitable pressurized fluid source, pressurization of said chamber effecting relative axial displacement of said inner and outer sleeve members.

2. A joint as claimed in claim 1 wherein said means for introducing a pressure medium between the contacting surfaces of said inner and outer sleeves includes at least one circumferentially extending annular groove on the inner face of said outer sleeve and a port extending through said rings and outer sleeve connected with said groove.

3. A joint as claimed in claim 1 including a cover member mounted on the extended end portion of said inner sleeve, the inner axial end face of said cover member defining a wall of said chamber and including seal means at the juncture of said cover member and inner sleeve and outer ring.

References Cited

UNITED STATES PATENTS

| | | | |
|---|---|---|---|
| 2,564,670 | 8/1951 | Bratt | 287—108 X |
| 2,814,515 | 11/1957 | Knudsen | 287—52 |
| 3,033,597 | 5/1962 | Miller | 287—52 |
| 3,097,003 | 7/1963 | Deve et al. | 287—53 |

THOMAS F. CALLAGHAN, Primary Examiner

U.S. Cl. X.R.

285—381